United States Patent [19]

Espe et al.

[11] Patent Number: 5,709,182
[45] Date of Patent: Jan. 20, 1998

[54] AIR INTAKE DEVICE HAVING A VARIABLE SUCTION PIPE LENGTH

[75] Inventors: Carsten Espe, Thalmassing; Peter Fischer, Regensburg, both of Germany

[73] Assignee: Siemens Aktiengesellschaft, Munich, Germany

[21] Appl. No.: 782,428

[22] Filed: Jan. 15, 1997

[30] Foreign Application Priority Data

Sep. 14, 1995 [DE] Germany ............. 44 25 044.4
Dec. 23, 1995 [DE] Germany ............. 295 10 694 U

[51] Int. Cl.⁶ ................................. F02M 35/10
[52] U.S. Cl. ................................. 123/184.55
[58] Field of Search ............ 123/184.55, 184.53, 123/184.21

[56] References Cited

U.S. PATENT DOCUMENTS

| | | | |
|---|---|---|---|
| 2,835,235 | 5/1958 | Gassmann | 123/184.55 |
| 4,619,226 | 10/1986 | Ueda et al. | 123/184.55 |
| 4,646,689 | 3/1987 | Katsumoto et al. | 123/184.55 |
| 4,726,329 | 2/1988 | Atkin | 123/184.55 |
| 4,854,270 | 8/1989 | Melde-Tuczai et al. | 123/184.55 |
| 4,858,568 | 8/1989 | Obayashi et al. | 123/184.55 |
| 4,932,369 | 6/1990 | Parr | 123/184.55 |
| 5,156,117 | 10/1992 | Muller et al. | 123/184.55 |

FOREIGN PATENT DOCUMENTS

| | | |
|---|---|---|
| 0 586 123 | 3/1994 | European Pat. Off. . |
| 2 682 431 | 4/1993 | France . |
| 87 04 464 | 7/1987 | Germany . |
| WO 93/00505 | 1/1993 | WIPO . |
| WO 94/05901 | 3/1994 | WIPO . |

*Primary Examiner*—David A. Okonsky
*Attorney, Agent, or Firm*—Herbert L. Lerner; Laurence A. Greenberg

[57] ABSTRACT

An air intake device with individual suction pipes having a variable effective length includes entry ports which are provided between a region of each of the suction pipes and a manifold. The entry ports can be closed by a closing device. The closing device is disposed outside a range of influence of the intake air flowing through the suction pipes, so that as a result no force which could move the closing device out of place is exerted on the latter. Air guide elements and air guide walls are provided in order to prevent the intake air from breaking away. The air intake device can be used in the intake pipe of an internal combustion engine.

6 Claims, 5 Drawing Sheets

AIR INTAKE DEVICE HAVING A VARIABLE SUCTION PIPE LENGTH

CROSS-REFERENCE TO RELATED APPLICATION

This application is a Continuation of International application Ser. No. PCT/DE95/00917, filed Jul. 13, 1995.

BACKGROUND OF THE INVENTION

FIELD OF THE INVENTION

The invention relates to an air intake device for an internal combustion engine, including a cylindrically constructed manifold for intake air, at least one suction pipe for each cylinder of the internal combustion engine, the suction pipe connecting the associated cylinder to the manifold, an entry port into each suction pipe, and a closing device having a closing part and a rotary shaft and with which the entry ports can be closed by rotating the closing device through a predetermined angle, the rotary shaft being mounted approximately parallel to the longitudinal axis of the cylindrical manifold.

The invention is accordingly aimed at suction pipes which are variable or adjustable between two lengths, with the suction pipe length being adaptable in each case to the operating state of an internal combustion engine. Consequently, inter alia, the engine power can be increased, the fuel consumption lowered and the emission of harmful substances reduced.

Such a device is known, for example, from German Utility Model 87 04 464 U, in which arcuate suction pipe sections are displaceable one inside the other through the use of a drive device, in order to make the suction pipe length variable. However, the disadvantage of a device of that type is that the leakproofing of the suction pipes in the overlap region can be mastered only in a way that involves a high outlay.

An air intake device is also known in which each suction pipe has a perforation along its path from the manifold to the cylinder of the internal combustion engine, and in which the perforation is connected to the manifold through a short pipe section. A flap which is disposed in that pipe section is rotatable and closes or opens the interior of the pipe section depending on the operating state of the internal combustion engine. A flush closing of the entry region through the use of the flap is not possible due to the curved shape of the suction pipes and the short pipe sections, that is to say the flap has to be set back somewhat into the short pipe section. Consequently, with the flap closed, a so-called dead volume, which adversely influences the flow of the intake air, occurs upstream of the flap in the direction of the suction pipe facing the cylinder.

Furthermore, Published International Application WO 93/00505 discloses an air intake device, in which the effective length of suction pipes between cylinders of an internal combustion engine and one or more manifolds can be changed depending on the operating state of the internal combustion engine. That is carried out by providing a port in each case in a specific region of a suction pipe which is adjacent a manifold, with the port being capable of being closed by a flap so that a long suction pipe is formed. In the opened state of the flap, the flap closes part of a suction pipe and thereby opens the shorter path between the manifold and the short suction pipe region to the cylinder head of the internal combustion engine. The flap is mounted on one side at the boundary region between the suction pipe and the manifold. It is generally known that pulsating backflows occur when an internal combustion engine is in operation. Those backflows will cause the flap to vibrate or rattle as a result, and that, in addition to giving rise to undesirable noise, may impair stable operation of the internal combustion engine if considerable actuating and closing forces for the actuation of the flap are not exerted.

SUMMARY OF THE INVENTION

It is accordingly an object of the invention to provide an air intake device with individual suction pipes having a variable effective length, which overcomes the hereinaforementioned disadvantages of the heretofore-known devices of this general type, without causing flow losses or disturbances of the air flow, such as breakaway vortices at a respective entry port to a suction pipe.

With the foregoing and other objects in view there is provided, in accordance with the invention, an air intake device for an internal combustion engine, comprising a cylindrical manifold for intake air, the manifold having a longitudinal axis; individual suction pipes disposed at a given spacing, the suction pipes each associated with a respective cylinder of an internal combustion engine for connecting the associated cylinder to the manifold; entry ports each leading into a respective one of the suction pipes; and a closing device constructed as a cylinder sector and having a closing part and a rotary shaft mounted approximately parallel to the longitudinal axis of the cylindrical manifold, the closing device having chambers spaced apart from one another by the given spacing, the chambers having passage ports, and the closing device pivoting through a predetermined angle about the rotary shaft within the manifold between a first position in which the closing device closes the entry ports and a second position in which the closing device opens the entry ports, permitting the intake air to flow from the manifold into the chambers and through the passage ports toward the entry ports.

In accordance with another feature of the invention, the closing device has an air guide wall connecting the closing part to the rotary shaft in the manifold, the air guide wall forming a wall region of the chambers.

In accordance with a further feature of the invention, the entry ports to the suction pipes have a given effective width, and the closing device has an air guide element disposed at a distance from the air guide wall corresponding to the given effective width and extending over a predetermined length into the manifold.

In accordance with an added feature of the invention, the air guide wall has a slightly curved shape guiding a stream of the intake air from the manifold and forming an approximately tulip-shaped intake port together with the air guide element.

In accordance with an additional feature of the invention, the closing device has intermediate walls with lengths, and the air guide element and the air guide wall have lengths and form a suction pipe prolongation according to the respective lengths and the lengths of intermediate walls, together forming an intake region portion.

In accordance with a concomitant feature of the invention, the suction pipes each have at least one peripheral projection disposed in the vicinity of a respective one of the entry ports, the peripheral projection projecting toward the manifold, and the closing part bearing against the peripheral projection when the closing device closes the entry ports.

Thus, since the closing part closes the entry port in an approximately flush manner in the case of a long suction pipe, virtually no dead space occurs in this region. There is therefore no flow loss with regard to the intake air in this region. In the opened state of the closing part, the closing part adapts to the intake air stream due to its geometrical shape, so that it steers the intake air coming from the manifold into the entry, causing the routing of the air stream to be improved thereby.

Moreover, by virtue of the positioning of the closing device outside the range of influence of the suction pipe, it is possible to avoid the "rattling" of the flaps which occurs as a result of the structure of the above-mentioned Published International Patent Application WO93/00505 and which is caused by the pulsating backflow of the intake air occurring in the intake tract or pipe of an internal combustion engine.

A further advantage of the device according to the invention is that, by virtue of the particular positioning of the closing device, it is not necessary to apply any force to overcome an intake air stream, during the connection and disconnection of a suction pipe part. The switching power of the closing device can consequently be kept low in an advantageous way.

By constructing the closing device with an air guide wall and an air guide element as an intake funnel, it is possible, through the use of an individual construction in terms of their length, to influence the effective suction pipe length in a simple way, so that an exact adaptation to the respective type of internal combustion engine can be carried out with the same suction pipes, but, in a simple way, with a different air guide wall and a different air guide element. This can then expediently be executed by exchanging an existing closing device for a different one.

Furthermore, breakaway vortices of the intake air in the region of the entry port can be avoided by virtue of the particular shaping and positioning of the air guide wall and the air guide element, so that no effective weakening of the passage cross section of the suction pipes for the intake air occurs.

Other features which are considered as characteristic for the invention are set forth in the appended claims.

Although the invention is illustrated and described herein as embodied in an air intake device having a variable suction pipe length, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
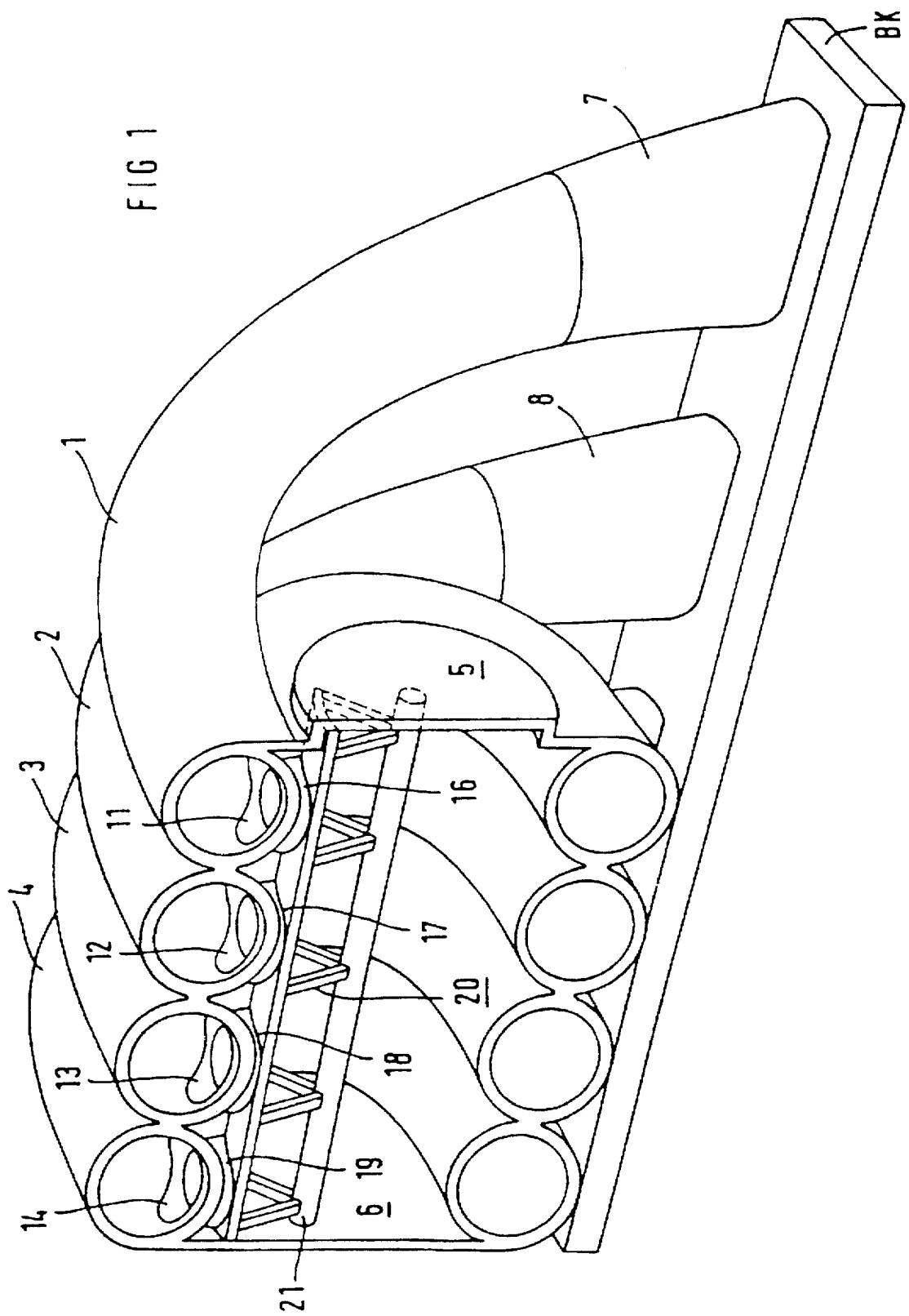
FIG. 1 is a diagrammatic, partly-sectional, perspective view of a first embodiment of an air intake device for an internal combustion engine.

Referring now to the figures of the drawings in detail and first, particularly, to FIG. 1 thereof, there is seen an air intake device which is constructed specially for a four-cylinder internal combustion engine. Accordingly, four suction pipes 1, 2, 3, 4 are provided which are of arcuate shape. At one end, the suction pipes have suction inlets 5 which are connected to a manifold 6 that is in turn connected to a non-illustrated air filter. At the other end, each suction pipe is connected to a pipe connection piece (only pipe connection pieces 7 and 8 are shown) for an injection valve (only a valve 9 is shown in FIG. 2) and for the supply of air to a respective combustion space of the internal combustion engine 10 (which is merely suggested in the drawing).

Figure 2:
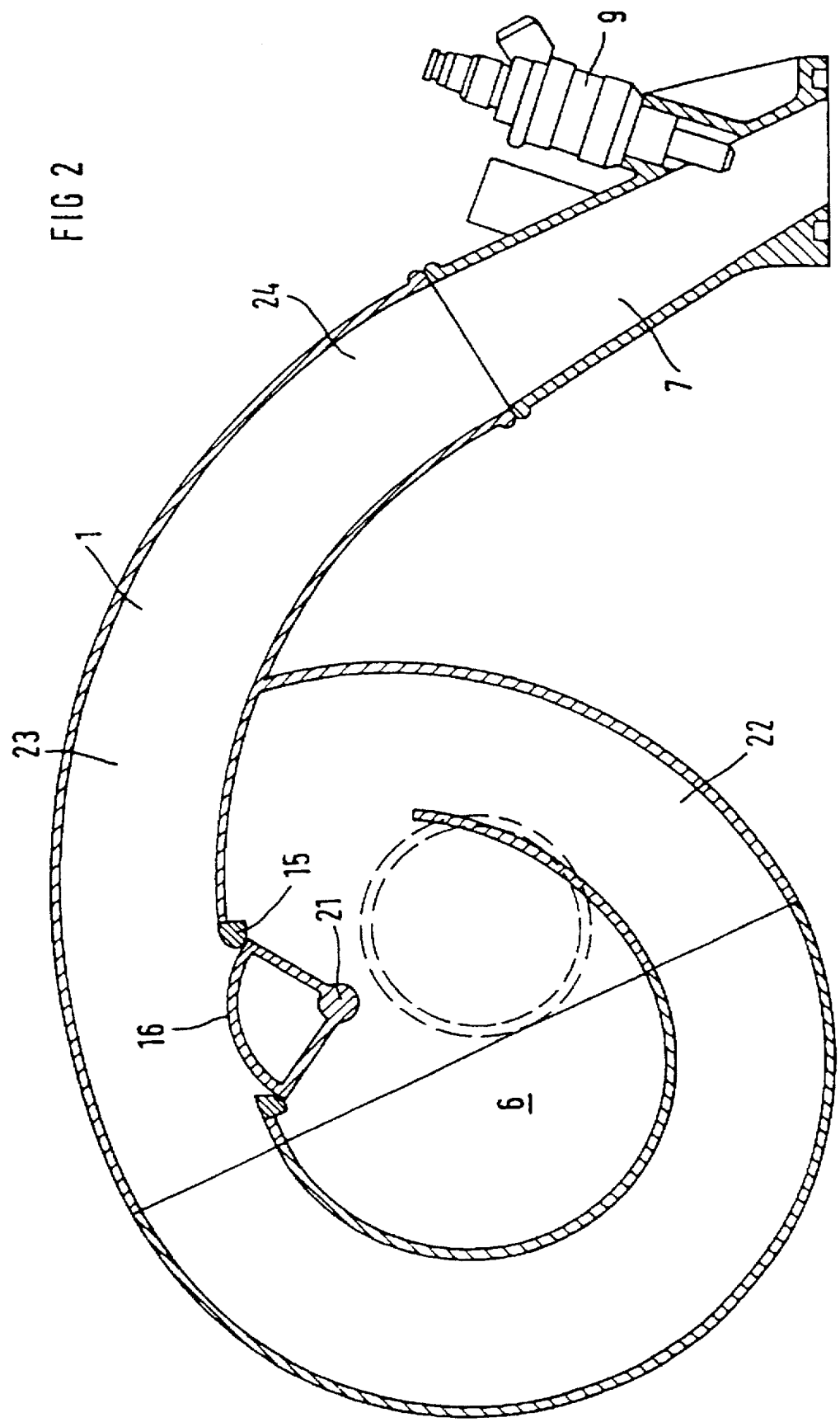
FIG. 2 is a cross-sectional view of the air intake device of FIG. 1.

As can be seen clearly from FIGS. 1 and 2, the end of each suction pipe facing the internal combustion engine is respectively provided with a perforation, through the use of which entry ports 11, 12, 13, 14 are formed in each case. As is seen in FIG. 2, the region of each entry port facing the manifold 6 is provided with a peripheral nose or projection 15. Each entry port can be closed by a closing device which is formed essentially of closing parts 16, 17, 18, 19. The closing parts 16, 17, 18, 19 are disposed on a common carrier 20 in such a manner as to be spaced apart from one another according to the spacing of the entry ports. The closing parts are constructed in the manner of surface segments of a cylinder jacket, having a central part which is mounted rotatably on a common switching shaft 21 in the manifold 6. In this case, the shaft can be disposed in such a way that it is located essentially outside the intake air stream, so that the intake air stream is not disturbed.

Figure 3:
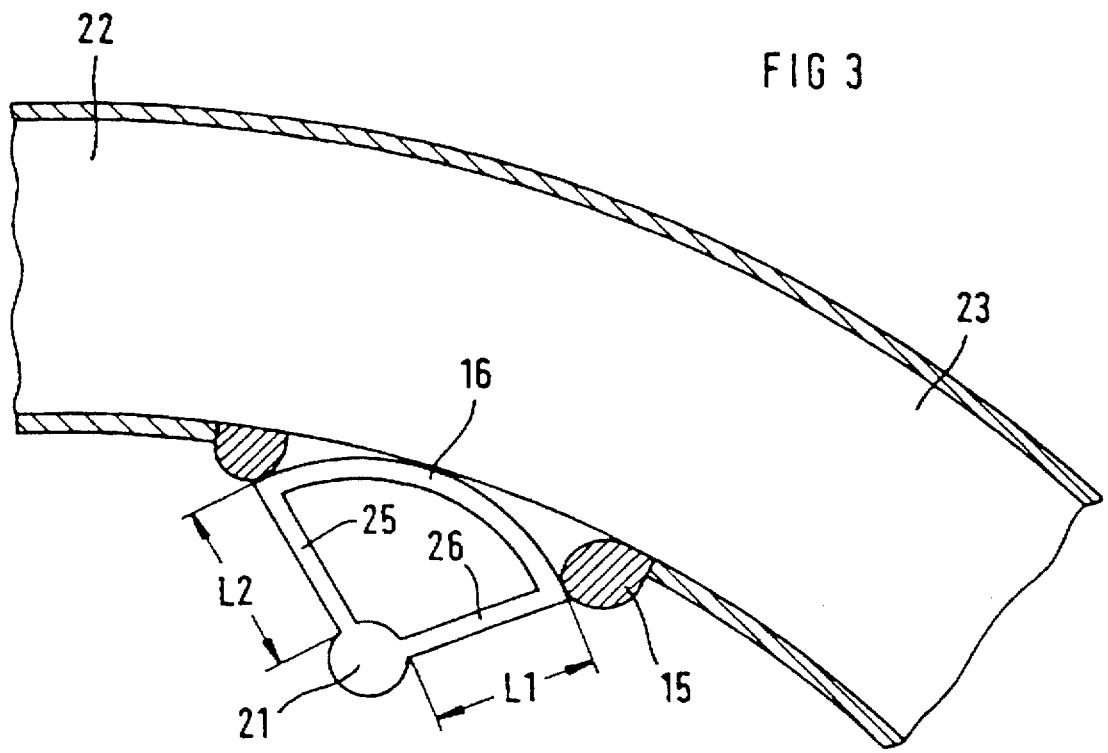
FIGS. 3 and 4 are fragmentary, sectional views of the air intake device.
Figure 4:
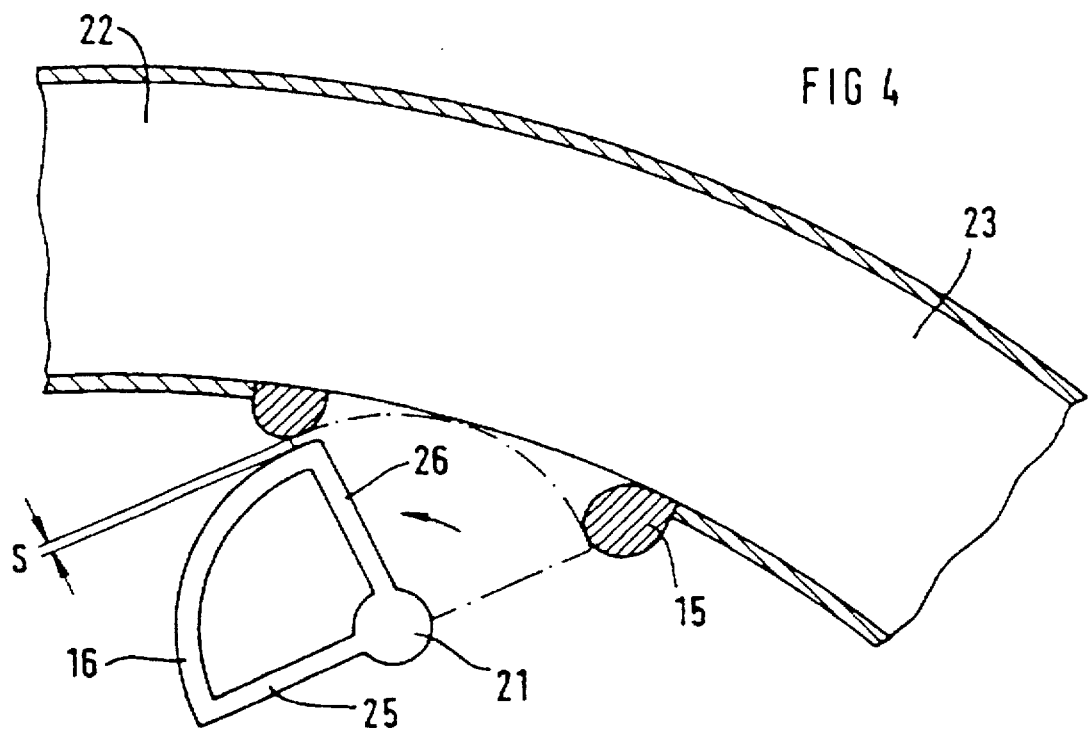

Furthermore, the closing device can be constructed asymmetrically, so that an eccentric mounting of the switching shaft 21 is obtained, with the result that the entry ports are sealingly closed only just before the termination of the closing operation of the closing device. Frictional losses during the closing operation can be reduced thereby, which has a beneficial effect on the drive of the closing device. In this respect, FIGS. 3 and 4 show the closing device in detail in two different positions. FIG. 3 shows the closing part 16 in the closed position and FIG. 4 in the opened position. As is indicated in FIG. 3, the closing part has two webs 25 and 26 which have different lengths. The web 26 is constructed with a length L1 that is somewhat shorter than a length L2 of the web 25. As a result, as can be seen from FIG. 4, in the opened state of the closing part a gap S is formed between the nose or projection 15 and the closing part, so that the closing part can be brought into its closing position with low friction.

The entry ports can be opened or closed depending on the operating state of the internal combustion engine. In the closed state, the intake air entering the manifold 6 runs through a first region 22 of each suction pipe 1, 2, 3, 4, a second region 23 downstream of the closed entry ports and a third approximately slightly curved region 24, until it can pass through the pipe connection pieces 7, 8, and enter the combustion chamber of the internal combustion engine, so that a long intake air path is formed.

If, in contrast to the condition described above, the closing parts are pivoted through the use of the carrier 20, so that the entry ports 11–14 are opened, most of the intake air passes directly into the second regions 23 and thereafter through the third regions 24 and the pipe connection pieces 7, 8. into the combustion chamber of the internal combustion engine.

When the closing parts 16, 17, 18, 19 are pivoted counterclockwise, the inner surface of the envelope or shell of each closing part advantageously forms an air guide for the intake air, so that air vortices at the entry ports can be avoided.

Figure 5:
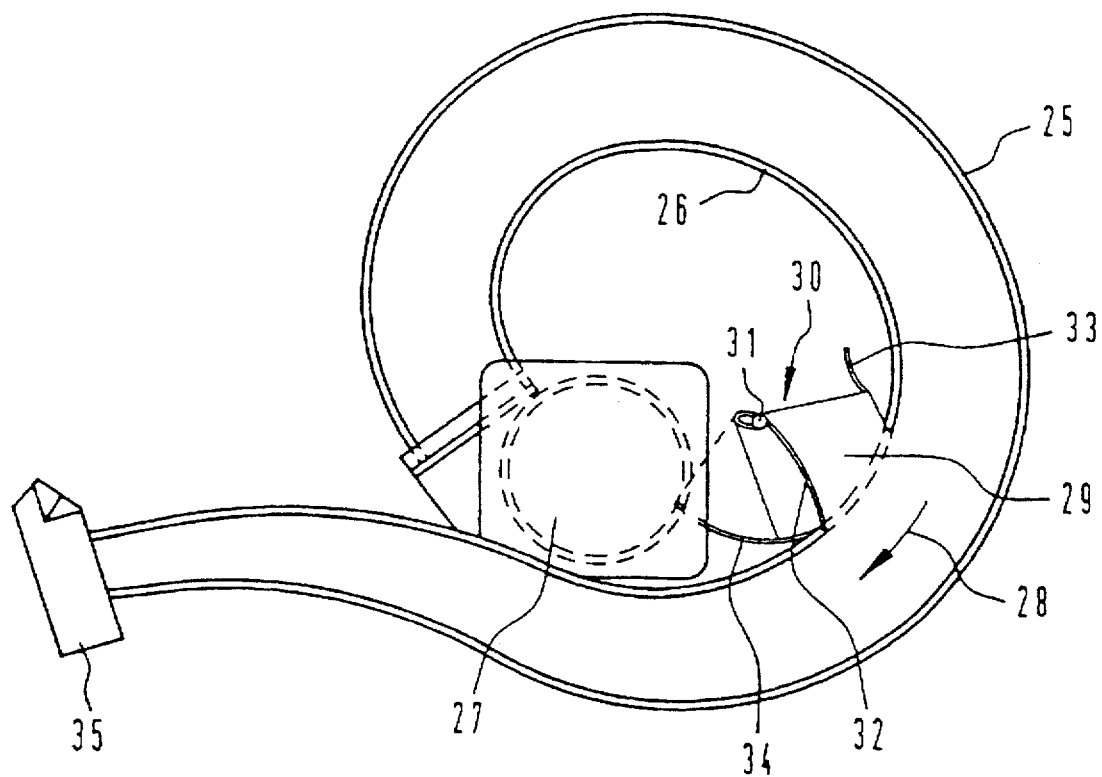
FIG. 5 is a simplified cross-sectional view of a second embodiment of a suction pipe with a closing device.

FIG. 5, which shows a second exemplary embodiment of the invention, illustrates a suction pipe 25 that is intended to represent a plurality of suction pipes. One end of the suction pipe 25 is connected to a manifold 26 which in turn is connected to a non-illustrated throttle flap that is indicated herein as a throttle flap connection piece 27 and is supplied with intake air. Another end of the suction pipe 25 is connected to a cylinder head flange 35. The intake air is indicated by arrows 28.

In a predetermined portion of the suction pipe 25, a wall of the suction pipe has a perforation which forms an entry port 29. This entry port 29 is coacted directly to the manifold 26 and can be selectively closed by a closing device 30 according to the operating state of the internal combustion engine. This is capable of being carried out through the use of a motor control.

Figure 6:
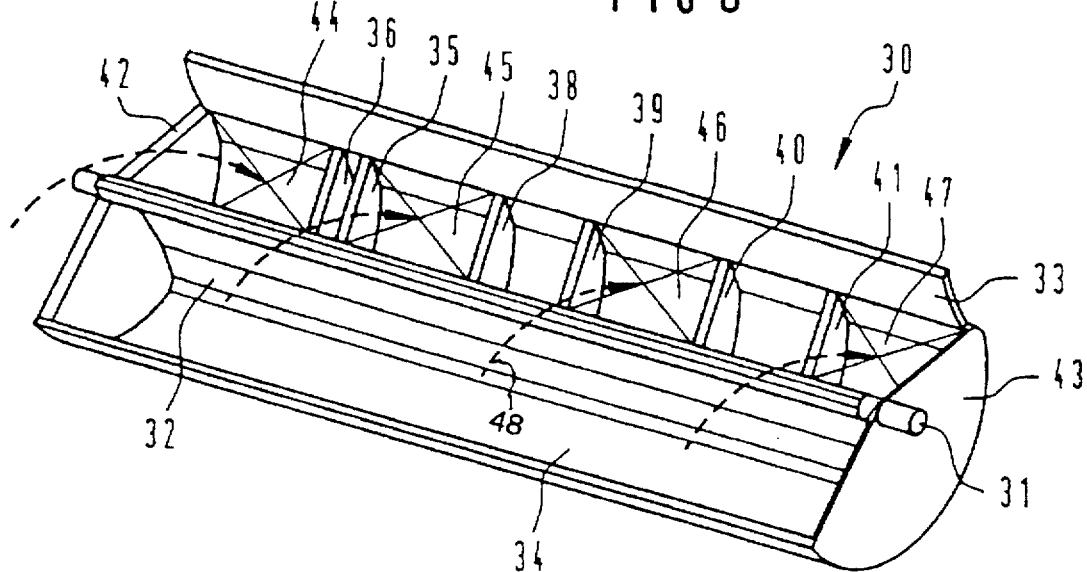
FIG. 6 is a perspective view of a closing device, as seen from the intake air inlet side of the closing device.
Figure 7:
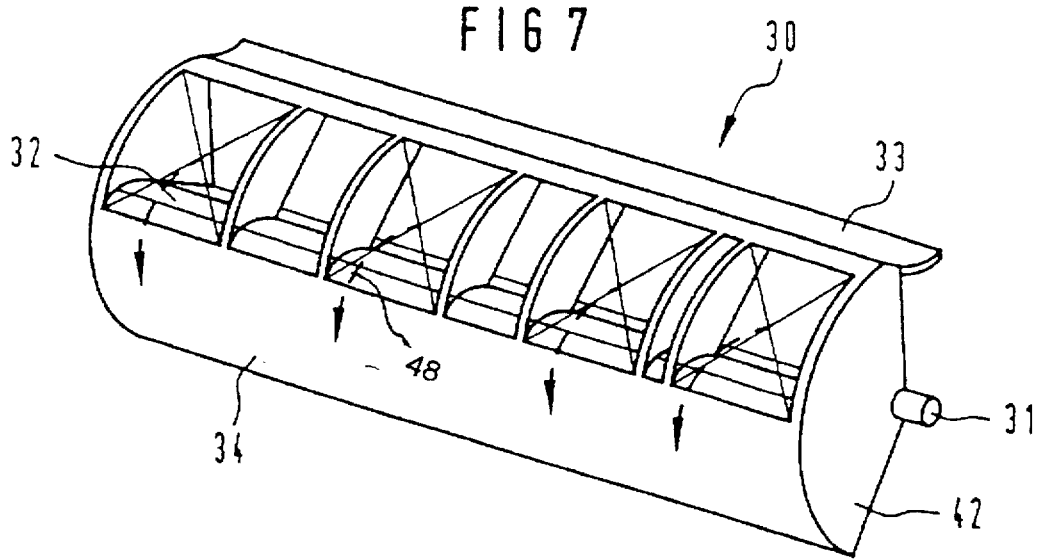
FIG. 7 is a perspective view of the closing device of FIG. 2, looking toward the intake air outlet side of the closing device.

The closing device 30, which is shown in detail in different views in FIGS. 6 and 7, is formed of a rotary shaft 31 that is mounted approximately centrally in the manifold 26, perpendicularly to the surface of the entry port 29. A closing mechanism which is connected to this rotary shaft 31 is formed of an air guide wall 32, an air guide element 33 and a closing part 34 that is constructed as a surface segment of a cylinder jacket and which can close the entry port 29. At the same time, the closing part 34 is shaped in such a way that, in the closing state of the entry port 29, it is adapted to the cutout of the entry port. Moreover, the air guide wall 32 and the air guide element 33 are shaped in such a way that they are adapted to the intake air stream from the manifold 26 into the entry port 29, so as to avoid a breakaway of the intake air at the entry point into the suction pipe when the entry port is open. For this purpose, the air guide wall 32 has a slightly curved shape guiding the intake air stream. The air guide element 33 extends in the direction of the manifold 26 and has a curved shape which forms an approximately tulip-shaped inlet port together with the air guide wall 32 in the direction of the manifold. The inlet port leads to passage ports 48 of the chambers which are indicated by arrows. The intake air is guided through the approximately tulip-shaped inlet port and passage ports, from the manifold 26 through the entry port 29 into the suction pipe 25. Through the use of the entry port and a neck which is formed by the air guide element 33 and the air guide wall 32, the effective suction pipe length to the cylinder head flange 35 can be adjusted by a particular amount. This can be carried out by exchanging the closing device 30 for another closing device 30 having different dimensions of the air guide wall and of the air guide element, without changes to the suction pipes having to be made, so that the intake device for the internal combustion engine can easily be adapted to different types of internal combustion engines.

In principle, each air guide element and each air guide wall forms a connection with the respective entry port to the suction pipe. However, a look at FIGS. 6 and 7 shows that the closing device illustrated therein is constructed in such a way that all of the air guide elements and air guide walls are combined. To that and, intermediate walls 36 to 41 and terminating side walls 42, 43 are disposed according to the spacing of the individual suction pipes, so that individual suction pipe regions (chambers) 44 to 47 are formed.

We claim:

1. An air intake device for an internal combustion engine, comprising:

a cylindrical manifold for intake air, said manifold having a longitudinal axis;

individual suction pipes disposed at a given spacing, said suction pipes each associated with a respective cylinder of an internal combustion engine for connecting the associated cylinder to said manifold;

entry ports each leading into a respective one of said suction pipes; and a closing device constructed as a cylinder sector and having a closing part and a rotary shaft mounted approximately parallel to the longitudinal axis of said cylindrical manifold, said closing device having chambers spaced apart from one another by said given spacing, said chambers having passage ports, and said closing device pivoting through a predetermined angle about said rotary shaft within said manifold between a first position in which said closing device closes said entry ports and a second position in which said closing device opens said entry ports, permitting the intake air to flow from said manifold into said chambers and through said passage ports toward said entry ports.

2. The air intake device according to claim 1, wherein said closing device has an air guide wall connecting said closing part to said rotary shaft in said manifold, said air guide wall forming a wall region of said chambers.

3. The air intake device according to claim 2, wherein said entry ports to said suction pipes have a given effective width, and said closing device has an air guide element disposed at a distance from said air guide wall corresponding to said given effective width and extending over a predetermined length into said manifold.

4. The air intake device according to claim 3, wherein said air guide wall has a slightly curved shape guiding a stream of the intake air from said manifold and forming an approximately tulip-shaped intake port together with said air guide element.

5. The air intake device according to claim 4, wherein said closing device has intermediate walls with lengths, and said air guide element and said air guide wall have lengths and form a suction pipe prolongation according to said respective lengths and said lengths of intermediate walls, together forming an intake region portion.

6. The air intake device according to claim 1, wherein said suction pipes each have at least one peripheral projection disposed in the vicinity of a respective one of said entry ports, said peripheral projection projecting toward said manifold, and said closing part bearing against said peripheral projection when said closing device closes said entry ports.

* * * * *

UNITED STATES PATENT AND TRADEMARK OFFICE
CERTIFICATE OF CORRECTION

PATENT NO. : 5,709,182
DATED : January 20, 1998
INVENTOR(S) : Carsten Espe et al.

It is certified that error appears in the above-identified patent and that said Letters Patent is hereby corrected as shown below:

TITLE PAGE:
Item [63] should read as follows:

Continuation of PCT/DE95/00917, July 13, 1995.

Item [30] should read as follows:

July 15, 1994    [DE]   Germany .......... 44 25 044.4

Signed and Sealed this

Twenty-second Day of December, 1998

*Attest:*

BRUCE LEHMAN

*Attesting Officer*      *Commissioner of Patents and Trademarks*